United States Patent [19]

Maeda et al.

[11] Patent Number: 4,940,488

[45] Date of Patent: Jul. 10, 1990

[54] METHOD OF SMELTING REDUCTION OF ORES CONTAINING METAL OXIDES

[75] Inventors: Takuya Maeda; Keikichi Murakami; Tsutomu Yamada, all of Kobe; Mitsuharu Kishimoto, Hyogo; Kenichi Yajima, Kobe, all of Japan

[73] Assignee: Kawasaki Jukogyo Kabushiki Kaisha, Hyogo, Japan

[21] Appl. No.: 403,058

[22] Filed: Sep. 1, 1989

Related U.S. Application Data

[63] Continuation-in-part of Ser. No. 278,203, Nov. 30, 1988, abandoned.

[30] Foreign Application Priority Data

Dec. 7, 1987 [JP] Japan ................................. 62-310117
Dec. 8, 1987 [JP] Japan ................................. 62-310143

[51] Int. Cl.$^5$ ............................................. C21B 11/00
[52] U.S. Cl. ........................................ 75/500; 75/446
[58] Field of Search ..................... 75/26, 38, 40, 156; 266/160

[56] References Cited

U.S. PATENT DOCUMENTS

| | | | |
|---|---|---|---|
| 3,028,231 | 4/1962 | Klemantaski et al. | 75/26 |
| 3,936,296 | 2/1976 | Campbell | 75/26 |
| 4,244,732 | 1/1981 | Brauns | 75/38 |
| 4,566,904 | 1/1986 | Von Bogdandy et al. | 75/40 |
| 4,874,427 | 10/1989 | Hamada et al. | 75/26 |

Primary Examiner—Melvyn J. Andrews
Attorney, Agent, or Firm—Wenderoth, Lind & Ponack

[57] ABSTRACT

Metal oxide ore is subjected to smelting reduction to obtain the molten metal by a method which comprises prereducing said ore in solid state in a prereduction furnace, thereafter melting said ore and carrying out final reduction thereof in a smelting reduction furnace, and at the same time introducing gas generated in said smelting reduction furnace and having reductive capability into said prereduction furnace, the rate of prereducing said ore in said prereduction furnace being controlled at a value with a maximum of the order of 33 percent for raising the rate of utilization of energy to a maximum limit.

8 Claims, 5 Drawing Sheets

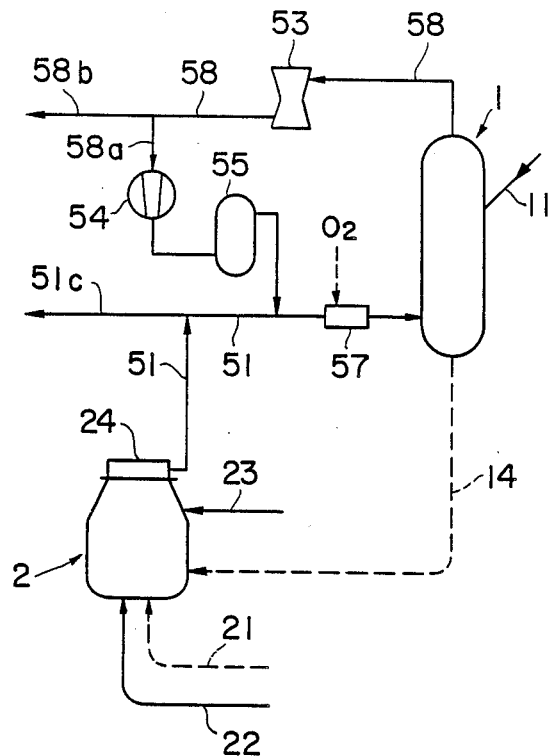
F I G. 6

METHOD OF SMELTING REDUCTION OF ORES CONTAINING METAL OXIDES

This application is a continuation-in-part of application Ser. No. 278,203 filed Nov. 30, 1988, now abandoned.

BACKGROUND OF THE INVENTION

This invention relates generally to production of metals by reduction of ores containing their oxides. More particularly, the invention relates to a smelting reduction method in which metal oxide ore, such as iron ore, is subjected in a solid state to a preliminary reduction (hereinafter referred to as prereduction) step in a prereduction furnace and thereafter melted in a smelting reduction furnace thereby to carry out final reduction of the ore. The invention concerns a smelting reduction method by which, particularly, the rate of energy utilization is increased, and the consumption of the reaction materials such as coal, oxygen, and lime is greatly reduced.

In the smelting reduction method, in general, metal oxide ore, such as iron ore (iron oxide), is reduced in a molten state thereby to produce iron or ferroalloy. Because of the promising possibility of its adaptation to coping with the further situations of raw materials and energy, this area of technology has recently attracted much attention, and research and development for its reduction to practice is being carried forward.

The principal advantageous features which this method affords as an iron producing method, in comparison with the blast furnace process, are use of low-price raw materials, reduction of preparatory processing steps such as sintering or pelletizing particulate ore, and miniaturization of necessary equipment. In addition, as a method in the production of ferroalloys, it has almost no dependency on the use of electric energy.

While various processes for practicing this smelting reduction method have been proposed, and the reduction furnaces used therein are of diverse form, the smelting reduction furnace of the metal smelting type is a representative form. In the case of a reducing furnace of this type for producing iron, for example, iron ore, together with coal and oxygen, is charged into molten iron bath, and the ore is thus reduced to obtain molten iron (pig iron). However, the reaction is rapid, it being possible to accomplish reduction at a rate which is 100 times or more rapid than in reduction of the ore in solid state, and the required equipment is of simple type. For these and other reasons, furnaces of this type are widely used in many processes.

On its debit side, a smelting reduction furnace of this type has the disadvantage of an extremely poor rate of utilization of energy. The fundamental reaction formula representing the reduction of iron oxides in a furnace of this type is as follows.

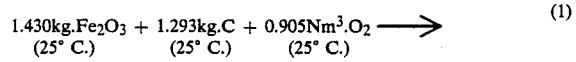
(1)

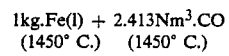

Since the applied energy in this formula is the heat quantity of combustion of C (carbon), when it is calculated from the quantity of generated heat of C (8,100 kcal/kg), its value becomes $1.293 \times 8,100 = 10,470$ kcal. On the other hand, the heat quantity which has been effectively utilized is the sum of 1,759 kcal, the quantity of heat for reduction of $Fe_2O_3$ (1 kg.), and 239 kcal, the heat quantity for melting Fe, that is, the total value 1,998 kcal.

Therefore, the rate of utilization of the energy applied is 1,998/10,470, that is, only 19 percent. Almost all of the remainder is discharged as exhaust gas. Accordingly, in order to increase the rate of utilization of energy, it is necessary to utilize the energy held by this exhaust gas.

A possible measure for this purpose is the so-called secondary combustion technique in which oxygen (or gas containing oxygen) is blown into the gas space part within the smelting reduction furnace thereby to cause combustion of a portion of the combustible gas issuing from the molten metal surface, and one portion of the heat thus generated is recovered and returned into the molten metal, whereby the energy utilization rate of the reduction furnace is increased. This measure utilizes the fact that, the combustion heat generated in the conversion of CO into $CO_2$ is 2.5 times the combustion heat generated during the conversion of C into CO.

In the case where the secondary combustion rate is 30%, that is, when 30% of the CO gas emitted from the melt within the furnace is caused to undergo combustion and thus be converted into $CO_2$, and the temperature of the gas within the furnace is set at 1,600° C., the fundamental formula of the reaction within the furnace becomes as follows.

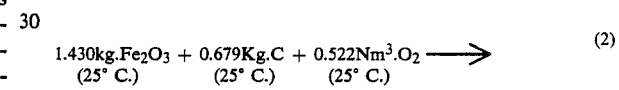
(2)

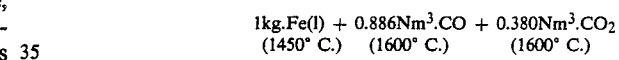

In this case, since the added energy is $0.679 \times 8,100 = 5,500$ kcal, the energy utilization rate becomes 36%. While this is a great improvement over the rate obtainable in the case where secondary combustion is not carried out, it is still insufficient. Elevating the secondary combustion rate to an extreme degree gives rise to an excessive rise in the temperature within the smelting reduction furnace and causes a problem in that the serviceable life of the refractories is shortened. Therefore, in order to further increase the energy utilization rate, the introduction of a newer technology is necessary.

As a consequence, a method wherein the raw-material ore is subjected to preparatory reduction or prereduction has been proposed. As mentioned hereinbefore, this method comprises prereducing the ore in its solid state in a prereduction furnace and then subjecting the ore to final reduction in a smelting reduction furnace as described above. For the reducing gas used in the prereduction furnace, high-temperature gas given off during the final reduction in the smelting reduction furnace is mainly used. For the prereduction furnace, a furnace of the fluidized bed type, in which the ore forms a fluidized bed and thus is contacted by and reacts with the above mentioned gas, is used in many cases. In this furnace, the reaction temperature is set at approximately 800° C. so as to obtain a high reduction efficiency without causing sintering of the ore.

In a smelting reduction method of this character as practiced heretofore, in order to obtain as high reduction rate (prereduction rate) in the prereduction furnace as possible, efforts are being devoted toward development toward this goal. Ordinarily, the prereduction rate has been set at 70% or higher value. The term "reduction rate" as used herein designates the rate of decrease of oxygen on the basis of the metal oxide contained in the raw-material ore as reference. For example, in the case where $Fe_2O_3$ is taken as reference (reduction rate 0%), the ore is reduced to $Fe_3O_4$ at a reduction rate of 11.1%, to FeO at a rate of 33.3%, and to Fe at a rate of 100%.

The energy utilization rate in a process carried out in apparatus comprising a prereduction furnace and a smelting reduction furnace of this character will now be considered.

The fundamental formula representing the reduction reaction of iron oxide in the prereduction furnace is as follows.

However, in order to reduce $Fe_2O_3$ at 800° C. to Fe, the $CO/(CO+CO_2)$ ratio in the gas at the outlet of the prereduction furnace must be maintained at 65% or higher value in accordance with the known Fe-CO equilibrium diagram (shown in FIG. 4 of the accompanying drawings briefly described hereinafter).

Accordingly, in order to increase the quantity of CO fed into the prereduction furnace in the case where the prereduction rate is to be 100% with this process, excess quantities of C and $O_2$ must be added into the smelting reduction furnace. In this case, since the reaction within the smelting reduction furnace is an exothermic reaction, it is necessary to add a coolant into the furnace in order to maintain thermal equilibrium. For example, when the case where $CO_2$ is used as the coolant is considered, the fundamental formulas therefor become as follows.

In the prereduction furnace (3)

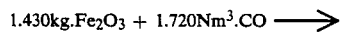

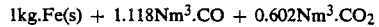

In the smelting reduction furnace (4)

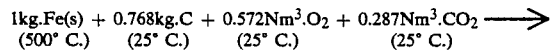

In this case, since the energy added is the combustion heat possessed by C, that is, $0.768 \times 8,100 = 6,221$ kcal, the effective utilization rate of heat is 32%.

In the case where the prereduction rate is 75%, that is, where $Fe_2O_3$ is reduced to FeO and Fe in the prereduction furnace, the formulas become as follows.

In the prereduction furnace (5)

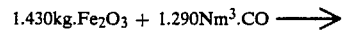

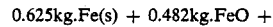

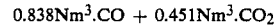

In the smelting reduction furnace (6)

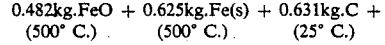

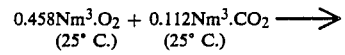

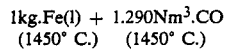

The energy utilization rate is 39%.

In a process employing a prereduction furnace also, the secondary combustion technique is applied in some cases in the smelting reduction furnace as described above. However, since the prereduction rate is of a high value of 70% or more, it is necessary to hold the secondary combustion rate at 30% or less in order to secure the CO quantity in the gas for prereduction.

Thus, in a process employing a prereduction furnace and a smelting reduction furnace, the potential heat and the reductive capacity of the gas given off from the smelting reduction furnace are utilized in the prereduction furnace, and at the same time the sensible heat of the ore prereduced in the prereduction furnace is utilized in the smelting reduction furnace, that is, in the process itself, a portion of the energy is being recycled. In contrast, in the smelting reduction method of the prior art, the surplus energy not utilized in the process has been wasted in the exhaust gas.

The above consideration may be summarized as follows. In the known smelting reduction method employing a prereduction furnace and a smelting reduction furnace, the following characteristic features from the viewpoint of energy utilization were afforded.

(i) A prereduction rate of 70% or more.

(ii) A large quantity of surplus energy not utilized in the process has been wasted in the exhaust gas.

A serious problem accompanying the above described known smelting reduction method is that the rate of consumption of carbon (C) necessary for obtaining metal by reducing the metal ore (metal oxide) is high, that is, the energy utilization rate is low. For example, this value is low even in comparison with that of reduction of iron ore by the blast furnace method. For this reason, it is said that, with respect to the smelting reduction method, extensive commercialization thereof is difficult as long as this problem is not solved.

Because of the large consumption of carbon, the consumption of oxygen becomes large. Therefore, in actual practice, not only do adverse effects on production quantities such as the quantity of slag produced, the consumption of coal, and the loss of extracted metal into the slag arise, but the cost of equipment to cope with these effects also increases.

The energy utilization rates examined above are all based on the fundamental reaction formulas, that is, they are energy utilization rates under ideal conditions. In an actual reduction process, however, C is not pure carbon but is in the form of coal, and $Fe_2O_3$ is also an iron ore containing impurities. Moreover, occurrences such as discharge of heat from the furnace structure (heat transmission loss) affect the results, whereby the actual rates become somewhat lower than these ideal rates.

Furthermore, since the prereduction rate is high in the conventional smelting reduction method, a prereduction furnace of large capacity is necessary. Another problem is that since metal iron is formed in the ore (prereduced iron), which tend to adhere to each other, the ore is formed into large lumps, whereby difficulties such as obstruction of reaction and transfer are encountered.

SUMMARY OF THE INVENTION

An object of this invention is to solve the above described problems in providing a smelting reduction method in which the rate of utilization of energy is raised to a maximum limit, and the consumption of materials such as coal, oxygen, and lime is made as low as possible.

According to this invention, in order to solve the above described problems, there is provided a method of smelting reduction of metal oxide ore, which comprises prereducing the ore in solid state in a prereduction furnace, thereafter melting the ore and carrying out final reduction thereof in a smelting reduction furnace, and at the same time introducing gas generated in the smelting reduction furnace and having reductive capability into the prereduction furnace, the rate of prereducing the ore in the prereduction furnace being controlled at a value below 30 percent.

By the practice of the smelting reduction method of this invention, metal ore which has been prereduced at a rate such that it is smaller than 30 percent in the prereduction furnace is positively reduced 100% in the smelting reduction furnace of high reduction rate, but since a high reductivity is not necessary in the reducing gas required in the prereduction furnace, secondary combustion can be amply carried out in the smelting reduction furnace. Therefore the rate of utilization of energy in the entire process rises to a maximum limit.

The nature, utility, and further features of this invention will be more clearly apparent from the following detailed description with respect to preferred embodiments of the invention when read in conjunction with the accompanying drawings, which are briefly described below.

BRIEF DESCRIPTION OF THE DRAWINGS

In the accompanying drawings:

FIG. 6 is a schematic flow diagram indicating a fourth example of apparatus for practicing a further embodiment of the invention.

DETAILED DESCRIPTION OF THE INVENTION

Figure 1:
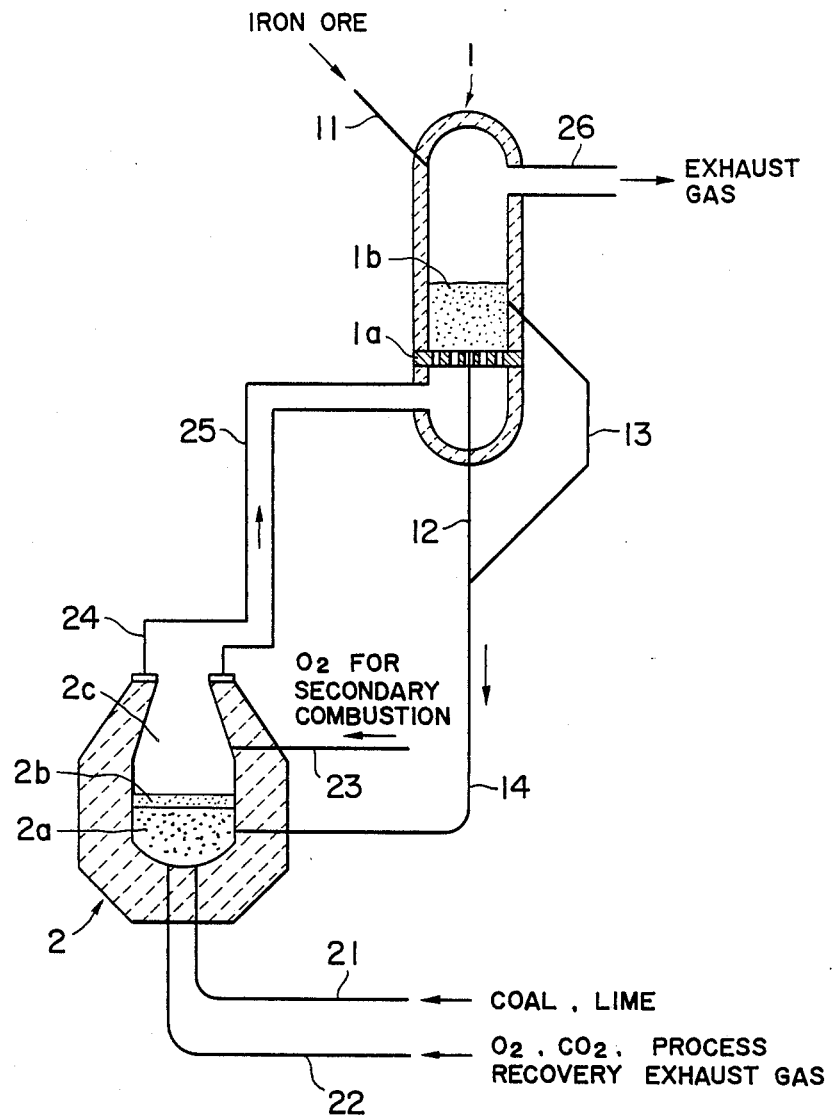
FIG. 1 is a schematic flow diagram indicating a first example of apparatus for practicing one embodiment of the invention.

Referring first to FIG. 1, the principal components of the apparatus shown therein for practicing the smelting reduction method of this invention are a prereduction furnace 1 and a smelting reduction furnace 2. In the mode of operation of the this example apparatus iron ore is first preparatorily reduced or prereduced in the solid state in the prereduction furnace 1 and is thereafter melted and subjected to final reduction in the smelting reduction furnace 2, while high-temperature gas having reducing capability which has been formed in the smelting reduction furnace 2 is introduced as a reducing gas into the prereduction furnace 1.

At the prereduction furnace 1, particulate iron ore is charged thereinto through an ore charging pipe 11, while reducing gas is introduced thereinto upwardly through a gas transfer pipe 25 and through a perforated dispersion plate (rectification plate) 1a at a lower part of the furnace 1, whereupon the particulate iron ore on the dispersion plate 1a forms a fluidized bed 1b which is agitated and mixed (by means not shown). The iron ore in this fluidized state is thereby contacted by the reducing gas, undergoes reaction, and is thereby prereduced.

The iron ore thus prereduced (prereduced iron) passes through the dispersion plate 1a and is discharged out through a discharge pipe 12 disposed below or through a side wall of the furnace 1 through a discharge pipe 13 and is transferred, for example, by gas conveyance, through a transfer pipe 14 to be charged into molten iron 2a in the smelting reduction furnace 2. Into the molten iron 2a (and slag 2b) within the smelting reduction furnace 2, in addition to the above mentioned prereduced iron, coal and lime are blown in through a charging pipe 21. Furthermore, oxygen and, if necessary, carbon dioxide gas ($CO_2$) or process recovery exhaust gas ($CO+CO_2+H_2+H_2O$) are blown in through a charging pipe 22. In addition, through a charging pipe 23, oxygen is blown into the gas space within the furnace 2, and a portion of the gas emerging from the iron melt surface is caused to undergo secondary combustion. As a result, a gas is generated within the smelting reduction furnace 2, is conducted through a furnace top hood 24 and the aforementioned gas transfer pipe 25, and is introduced into the prereduction furnace 1 to be used in the prereduction step. The resulting exhaust gas in the prereduction furnace 1 is discharged out through an exhaust gas pipe 26.

In the instant example, in order to increase the energy utilization rate of the entire process, the process is so controlled that almost all of the iron ore will be reduced to FeO in the prereduction furnace 1, and the secondary combustion rate in the smelting reduction furnace 2 is 20 to 50% and in the broader reaches of the invention the secondary combustion rate is 25% or more. In the case where the $Fe_2O_3$ is reduced to FeO in the prereduction furnace 1, the prereduction rate is smaller than 30%, but in the iron ore actually used as a raw material, some $Fe_3O_4$ of slightly lower oxygen content is also contained in addition to $Fe_2O_3$. Moreover, when the economy of the prereduction furnace is considered in view of its characteristics owing to its being of the fluidized bed type, the actual prereduction rate becomes approximately 20 to smaller than 30%.

The reason why the energy utilization rate is made high by setting the prereduction rate and the secondary combustion rate in this manner is as follows.

In a smelting reduction system as indicated in FIG. 1, in the case where the obtaining of a unit quantity of molten iron (ton) is considered, the following relationships are made apparent from a comparison and study of the fundamental reaction formulas (1) to (6) set forth hereinbefore.

(1) On the basis of comparison of (3)·(4) and (5)·(6): by changing the prereduction rate in the prereduction furnace 1, the quantity of CO required in the prereduction furnace 1 is caused to change, whereby the quantity of C required in the smelting reduction furnace 2 changes.

(2) On the basis of comparison of (1) and (2): when the secondary combustion rate in the smelting reduction furnace 2 is changed, the required quantity of C changes.

Figure 4:
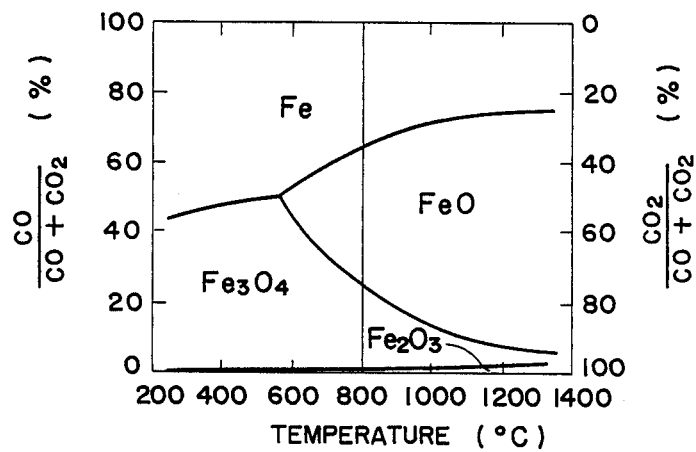
FIG. 4 is a reduction equilibrium diagram for reduction of iron due to CO gas.

(3) On the basis of comparison of (1) and (2): when the secondary combustion rate is changed, the quantity of the CO given off from the smelting reduction furnace 2 changes. Since the prereduction rate in the prereduction furnace 1 is caused to change by this CO quantity (reference: FIG. 4), the secondary combustion rate influences the prereduction rate.

From the above points of consideration, it can be thought that, by selecting a suitable prereduction rate and a suitable secondary combustion rate, the required quantity of C can be made a minimum, in other words, the effective utilization rate of energy can be made a maximum. Accordingly, we decided to determine the consumption of C on the basis of fundamental reaction formulas (1) to (6) with respect to various combinations of varying values of the prereduction rate and the secondary combustion rate.

In the calculations, in order to investigate the consumption rate of C (that is, coal) in reduction steps as close as possible to the actual case, factors such as the heat discharged (heat transmission loss) from the furnace structure in each case and the heat transfer efficiency into the molten iron of the heat generated by the secondary combustion were considered on the bases of results of preliminary tests carried out in advance. In addition, after setting variables such as the proportions of the raw materials and the molten iron as described below, the fundamental reaction formulas (1) to (6) were used after corrections.

(a) Raw materials:
  Iron ore: composition (%, dry state) . . .
    T.Fe: 67.8, FeO: 0.1, LOI: 0.5,
    $SiO_2$: 0.7, CaO: 0.06, MgO: 0.04
  Coal: composition (%, dry state) . . .
    T.C: 80.0, S: 0.5, H: O, N: 1.0
    O: 10.0
  Composition in coal ash (%, dry state)
    $SiO_2$: 60, CaO: 4, MgO: 15
  Lime: composition (%, dry state) . . .
    CaO: 53.0, MgO: 1.0, LOI: 42.7
(b) Molten iron: composition (%) . . . Fe: 94.5, C: 4.5
  Temperature . . . 1,450° C.
(c) Charging temperature: 500° C. of prereduction iron into smelting reduction furnace
(d) Reaction temperature in prereduction furnace: 800° C.
(e) Gas for cooling smelting reduction furnace interior: $CO_2$ (25° C.)
(f) CO quantity within prereduction furnace:

On the basis of the equilibrium diagram of FIG. 4, a suitable quantity was added to the value considered to be theoretically necessary for obtaining the specific prereduction rate, and the resulting value was taken as the minimum necessary value. For example, for reducing $Fe_2O_3$ $_{to\,FeO\,at}$ 800° C., the ratio $CO/(CO+CO_2)$ was caused to be 30% or higher, and for further reduction to Fe, this ratio was caused to be 70% or higher.

Figure 2:
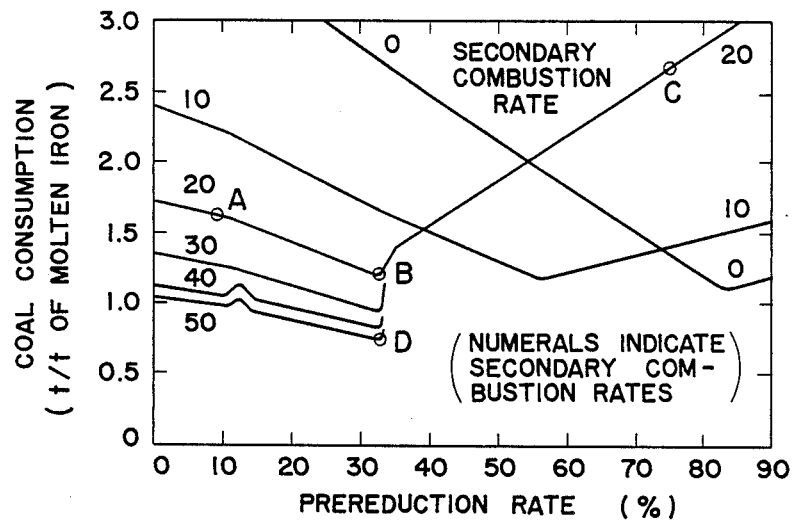
FIG. 2 is a graph indicating relationships between prereduction rate, secondary combustion rate, and coal consumption in the smelting reduction system shown in FIG. 1.

As a result of the above calculation, and with the consumption quantity of coal necessary for producing a unit quantity (1t) of molten iron expressed as t/t of molten iron, the graph shown in FIG. 2 was obtained. The coal consumption is taken as a value indicating the degree of consumption of the actual energy in place of the energy utilization rate under the ideal conditions as mentioned hereinbefore. This graph indicates the coal consumption in the case wherein the secondary combustion rate is set at increments of 10% from 0%, and the prereduction rate is varied from 0 to 90%. In this graph, cases where the gas temperature at the outlet of the smelting reduction furnace 2 exceeds 1,900° C. because of the secondary combustion are excluded.

As is apparent from FIG. 2, the coal consumption becomes a minimum when the secondary combustion rate is 50%, and the prereduction rate is below 30%. It can also be seen that, in the interval between 50 and 20% of the secondary combustion rate, and with a prereduction rate of approximately 33%, minimum values are indicated. Furthermore, the same graph indicates that, since a great quantity of CO is necessary in the case where the prereduction rate is 30% more, if the secondary combustion rate is made high (30% or higher), the coal consumption will increase tremendously.

When the consumption quantities of the coal, oxygen, and lime (per ton of molten iron) determined by the above calculations are indicated with respect to the points A to D in FIG. 2, the following results are obtained. Secondary combustion rate is abbreviated S.C.R., and prereduction rate is abbreviated P.R.
Point A (S.C.R. 20%, P.R. 9.3%)
  Coal 1.73t, oxygen 1,060$Nm^3$, Lime 0.31t
Point B (S.C.R. 20%, P.R. 33%)
  Coal 1.30t, oxygen 790$Nm^3$, lime 0.24t
Point C (S.C.R. 20%, P.R. 75%)
  Coal 2.70t, oxygen 1,730$Nm^3$, lime 0.47t
Point D (S.C.R. 50%, P.R. 33%)
  Coal 0.71t, oxygen 450$Nm^3$, lime 0.15t
Thus, at point B or D where the coal consumption is low (and P.R. is 33% in either case), the consumptions of oxygen and lime are also low.

Figure 3:
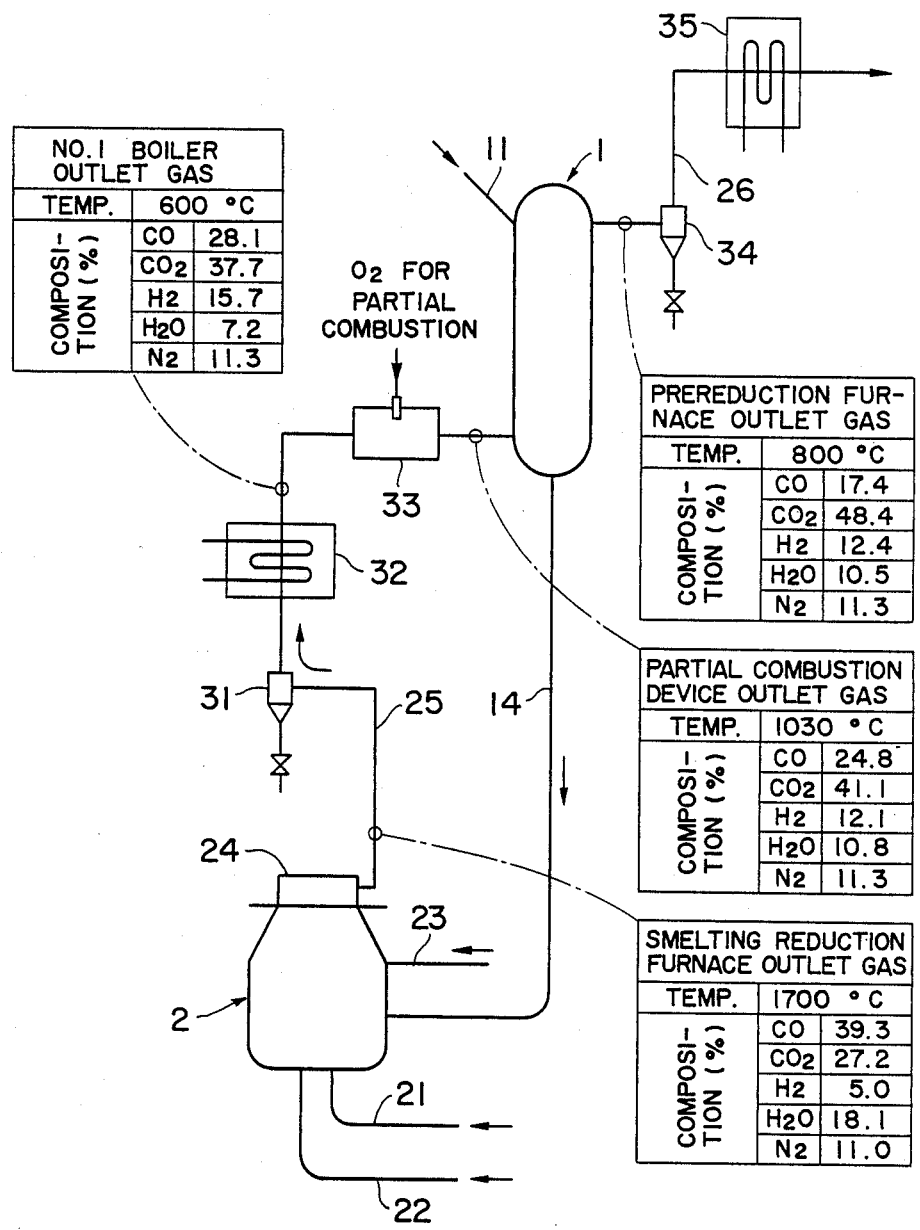
FIG. 3 is a schematic flow diagram indicating a second example of apparatus for practicing another embodiment of the invention.

The invention will now be described with respect to a second embodiment thereof and with reference to FIG. 3, in which those parts which are the same as or equivalent to corresponding parts in FIG. 1 are designated by like reference numerals. FIG. 3 illustrates an apparatus for practicing the smelting reduction process for iron production according to the invention which is basically the same as that indicated in FIG. 1. In this apparatus, the energy of gas produced in and discharged from two reduction furnaces is used for another purpose outside of the process thereby to effectively utilize the energy. On the basis of the results of analysis in the first embodiment of the invention, the prereduction rate is set at 33%, and the secondary combustion rate at 50% also in this example.

This example is characterized in that the gas formed in the smelting reduction furnace 2 is caused, in its transfer path to the prereduction furnace 1, to flow through a dust remover 31, a steam generator 32 (No. 1 boiler), and a partial gas combustion device 33, and the exhaust gas from the prereduction furnace 1 is caused to flow through a dust remover 34 and a steam generator 35 (No. 2 boiler). Therefore, these gases are respectively cleaned of dust by the dust removers 31 and 34 and conducted into the steam generators 32 and 35 to be used as heat sources for generating steam. By this utilization of these gases, the heat possessed by these gases is converted into steam energy, which therefore can be used for generating electric power, space heating, and other uses in the iron and steel plant.

The partial gas combustion device 33 operates to reheat the gas the temperature of which has dropped in the No. 1 boiler by blowing into this gas oxygen, or a gas containing oxygen, and burning a portion of the combustible component thereof thereby to raise the gas temperature to the value necessary for the prereduction furnace 1. Since the prereduction rate in the prereduction furnace 1 is low, the resulting gas is amply satisfactory for use as the gas for prereduction, even by this partial combustion wherein one portion of the CO or $H_2$ in the gas is burned and converted into $CO_2$ and $H_2O$, if the gas temperature rises. For increasing the thermal efficiency of the No. 1 boiler 32, the injection orifice for blowing in the oxygen for this partial combustion may be provided in the gas flow path within the No. 1 boiler 32.

The temperatures and compositions shown in the four tables in FIG. 3 are quantitative values indicating the states of the gases at various points in the gas flow paths. In this second example, these values indicate results of calculations carried out with the prereduction rate and the secondary combustion rate set as indicated above under the conditions (a) to (f) of the preceding first example and the following conditions (A), (B), and (C).

(A) Gas temperature variation in No. 1 boiler 32: 1,700° C. to 600° C.

(B) Partial combustion rate (proportion of conversion from $CO.H_2$ to $CO_2.H_2O$) at partial burner 33: 15%

(C) Gas temperature variation in No. 2 boiler 35: 800° C. to 400° C.

Among the values in the tables which are significant are those relating to the outlet gas of the partial gas combustion device 33 and the outlet gas of the prereduction furnace 1. The ratio $CO/(CO+CO_2)$ of the outlet gas of the partial burner 33 is 38% which is less than 65%. For this reason, when this gas is introduced into the prereduction furnace 1 to carry out prereduction of the iron ore at approximately 800° C., pure iron cannot be produced in the iron ore.

The outlet gas from the prereduction furnace 1 contains CO and $H_2$ of quantities which are ample for reducing the iron ore to FeO. That is, in the case where C and $H_2$ exist in the gas, the conditions for obtaining FeO at 800° C. are $CO/CO_2 > 0.35$ and, moreover, $H_2/H_2O > 0.34$. These conditions are met since the results of calculation for the outlet gas of the prereduction furnace 1 are $CO/CO_2 = 0.36$ and $H_2/H_2O = 1.18$. Furthermore, this gas which is discharged through the No. 2 boiler 35 contains chemical heat of 780 kcal/$Nm^3$ in terms of its composition, whereby it can be used as fuel within the iron and steel works similarly as in the case of blast furnace gas and the like.

The quantity of steam generated by the steam generators 32 and 35 becomes approximately 1.6t (per ton of molten iron) as a total. If all of this steam is used for generating electric power, it will become approximately 300 kW (perton of molten iron), which means that a great quantity of energy can be utilized outside of the process.

Still another advantageous feature of this example of apparatus is that fluctuations in the temperature and composition of the gas for prereduction arising from fluctuations in the operational conditions of the smelting reduction furnace 2 can be suppressed by varying the partial combustion rate. More specifically, in the operation of the smelting reduction furnace 2, the charging quantity of the coal, oxygen, or lime is varied in accordance with factors such as the degree of progress of the reduction reaction. As a consequence, the temperature and composition of the gas formed in the smelting reduction furnace 2 (that is, the gas for prereduction which is introduced into prereduction furnace 1) also fluctuates. By adjusting the partial combustion rate of the gas in the partial gas combustion device 33 in accordance with this fluctuation, the temperature and composition of the gas can be made to be those desirable for the gas for prereduction. For example, in the case where, as a consequence of a lowering of the secondary combustion rate by reducing the quantity of oxygen blown into the smelting reduction furnace 2, the content of CO in the gas increases and the gas temperature drops, the state of the gas can be corrected to suit a reduction rate below 30% by increasing the partial combustion rate in the partial gas combustion device 33.

The smelting reduction method of the invention described above is not limited to the production of iron by reducing iron ore but is applicable also to the production of other metals by a similar process such as that of obtaining ferrochromium by reducing chrominum ore ($Cr_2O_3$ or $FeCr_2O_4$).

By the practice of the above described smelting reduction method, the following beneficial effects are afforded.

(1) The consumption quantity of coal required for obtaining a specific quantity of a molten metal is greatly reduced.

(2) Together with the above effect (1), the consumption quantities of oxygen and lime are also reduced.

(3) Together with the above effects (1) and (2), the quantity of exhaust gas formed decreases.

(4) Together with the above effects (1) and (2), the quantity of slag formed in the molten metal decreases, whereby the loss of metal is reduced, and the yield of metal in the production thereof is increased.

(5) Together with the above effects (1) through (4), the equipment for conveying materials such as coal and lime, the equipment for supply oxygen, and the equipment for processing the exhaust gas can be reduced in scale and cost and their operation cost can be decreased.

(6) Since the prereduction rate is low, a prereduction furnace of small size can be used.

(7) Since a low reducing capacity (quantity of reductive component) of the gas for prereduction is sufficient, energy can be effectively utilized as, for example, the maximum recovery of sensible heat of the gas in the boilers as demonstrated in the second example.

Figure 5:
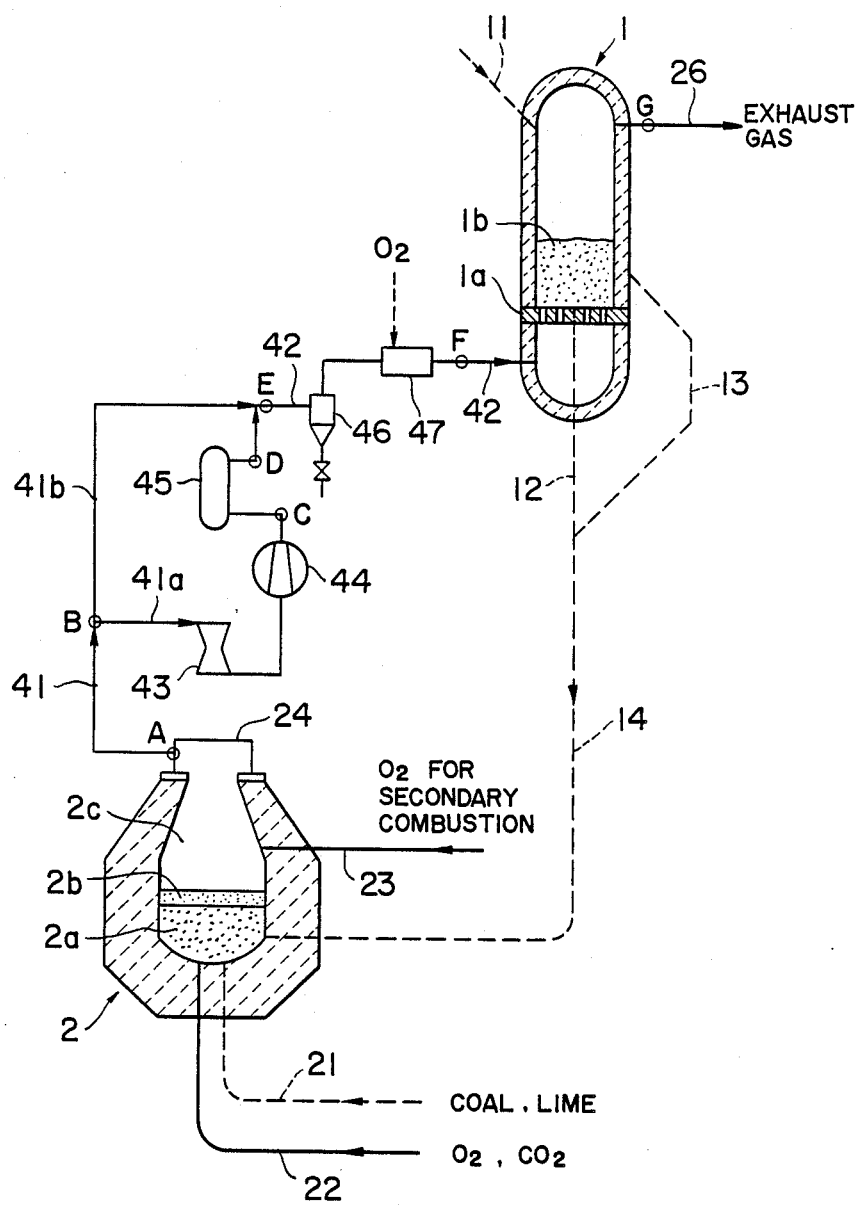
FIG. 5 is a schematic flow diagram indicating a third example of apparatus for practicing still another embodiment of the invention.

Still another (third) example of apparatus for practicing the smelting reduction method of this invention is shown in FIG. 5. In this apparatus, the gas obtained after secondary combustion from the smelting reduction furnace 2 is passed through a gas pipe 41 connected to the furnace top hood 24, and a portion of this gas is distributed through a branch gas pipe 41a branched from the gas pipe 41 and, passing through a wettype dust collector 43, a blower 44, and a decarburizing device 45, is joined and admixed in a gas pipe 42 with the gas which has flowed in the other branch gas pipe 41b. The resulting mixed gas is passed through a hot cyclone 46 and a partial combustion device 47 and, as a gas for prereduction, is introduced into the prereduction furnace 1.

The wet-type dust collector 43 is not limited in its type as long as it is a device capable of cooling and removing dust from the gas. The decarburizing device 45 also may be any of various types of gas reforming or modifying devices, for example, a device for reforming $CO_2$ into CO or $H_2$ through the use of a hydrocarbon or pulverized coal. In the partial combustion device 47, oxygen (or a gas containing oxygen) is blown into a portion of the gas to cause one portion of its combustible component to undergo combustion thereby to raise the temperature of the gas. In place of this device, a heating device of any type for raising the gas temperature can be used.

In this example, similarly as in the preceding examples, the prereduction furnace 1 is of the fluidized bed type. Iron ore in particulate form which is charged into this furnace 1 through the ore charging pipe 11 is caused by the gas for prereduction introduced into this furnace through the gas pipe 42 as described above to form a fluidized bed on the perforated dispersion plate (rectification plate) 1a and, in this state, is contacted by and reacts with the reduction gas to be prereduced. The iron thus prereduced is discharged through the discharge pipe 12 or 13 and is transferred, for example, by gas conveyance, through the transfer pipe 14 to be charged into the smelting reduction furnace 2. Separately, the above mentioned gas used in the prereduction is discharged out of the prereduction furnace 1 through the exhaust gas pipe 26.

In this third example, in order to increase the energy utilization rate of the entire process, the characteristics of the gas for prereduction are adjusted, and at the same time the secondary combustion rate in the smelting reduction furnace 2 is caused to be 60% or higher so that reduction will be carried out until the iron ore becomes almost FeO in the prereduction furnace 1. In the case where $Fe_2O_3$ is reduced to FeO in the prereduction furnace, the prereduction rate is 33.3%. However, the iron ore actually used as a raw material contains, in addition to $FeO_3$ also, some $Fe_3O_4$ of slightly low oxygen content. For this reason, the actual prereduction rate will be below 30%.

In a process as indicated in FIG. 5, by adjusting the characteristics of the gas for prereduction, the prereduction rate and the secondary combustion rate are set in this manner for the following reasons.

As described hereinbefore, the prereduction rate in the prereduction furnace 1 is determined by the quantity (proportion) of CO contained in the gas for prereduction. This CO quantity, in turn, is determined by the quantity of C (coal) charged into the smelting reduction furnace 2 and the secondary combustion rate. Furthermore, the quantity of C varies with the prereduction rate of the iron ore charged into the smelting reduction furnace 2. This trend can be easily understood by a comparative study of the fundamental reaction formulas (2), (5) and (6), a number of reaction formulas which have varied the secondary combustion rate and the prereduction rate, the known reduction equilibrium diagram concerning CO gas and iron shown in FIG. 4, and other data.

From a quantitative study of the above considered points, it appears possible to determine suitable values of the prereduction rate and the secondary combustion rate for reducing the consumption quantity of C for obtaining a unit quantity of molten iron Fe(l) to a minimum, in other words, for obtaining maximum utilization of energy. Accordingly, we determined these rates by calculation after setting realistic conditions (e.g., characteristics of the iron ore and the coal and heat loss from various parts). Then we carried out verification experiments. The results thus obtained were as follows.

(i) The consumption quantity of coal (C) becomes a minimum for a secondary combustion rate of 25% or higher when the prereduction rate is below 30%. These values are less than the minimum coal consumption quantity in the case where the secondary combustion rate is less than 25%. The coal consumption quantity in the case of a prereduction rate of below 30% decreases with increase of the secondary combustion rate over 20%.

(ii) When the secondary combustion rate exceeds 60%, the quantity of CO in the gas generated in the smelting reduction furnace drops. Therefore, unless this gas is reformed or modified, a prereduction rate of 30% and above, i.e., be attained.

To summarize: maintenance of the prereduction rate at below 30% and raising the secondary combustion rate as much as possible result in decreasing the coal consumption. For example, the coal consumption in the case of a secondary combustion rate of 50% and a prereduction rate of 33%, for example, becomes approximately 40% less than that in the aforedescribed example (secondary combustion rate 0% and prereduction rate 75%). This indicates a great degree of improvement.

If, in order to lower the coal consumption, the secondary combustion rate is set at 60% or higher, the generated gas from the smelting reduction furnace 2 cannot be used directly as it is as the gas for prereduction for the reason given in paragraph (ii) above. In this example, by adjusting the characteristics of the gas for prereduction, the prereduction rate was set at a value of the order of below 30% and the secondary combustion rate at 60% or higher for the reasons given above.

Trial calculations relating to the characteristics of the gases at various parts (points A through G in FIG. 5) of the gas piping of the apparatus of the instant example were carried out for the case where, by the use of the apparatus, the process is carried out under the conditions of a secondary combustion rate in the smelting reduction furnace 2 of 65%, a distribution of the generated gas from the gas pipe 41 of 50% to each of the branch pipes 41a and 41b, and combustion of 15% of the combustible component of the gas in the partial combustion device 47, whereupon the following results were obtained.

| Part | Gas composition (%) | | | | | Temp. (°C.) | Gas quantity (Nm³) |
|---|---|---|---|---|---|---|---|
| | CO | CO₂ | H₂ | H₂O | N₂ | | |
| A | 23.1 | 42.9 | 8.1 | 14.9 | 11.0 | 1700 | 1600 |
| B | 25.3 | 40.7 | 5.8 | 17.2 | 11.0 | 1050 | 1600 |
| C | 27.6 | 44.5 | 6.4 | 9.5 | 12.0 | 70 | 733 |
| D | 45.9 | 7.5 | 10.7 | 15.9 | 20.0 | 50 | 440 |
| E | 26.3 | 35.2 | 13.9 | 10.4 | 14.2 | 700 | 1240 |
| F | 23.1 | 38.4 | 10.7 | 13.6 | 14.2 | 1100 | 1240 |
| G | 16.3 | 45.1 | 7.6 | 16.8 | 14.2 | 800 | 1240 |

In the above mentioned trial calculations, it was assumed that, in the wet-type dust collector 43, 67Nm³ of $H_2O$ is removed with the cooling of and dust removal from the gas and that, in the decarburizing device 45, 90% or 293Nm³ of $CO_2$ in the gas is removed, and lowering of the temperatures of the gases within the various devices and gas pipes and, further, the accompanying shift reaction were considered.

Among the above quantitative values, the gas composition at point G (the outlet of the prereduction furnace 1) is noticed. In the gas at this point G, CO and $H_2$ are contained as the reductive component, and the percentage quantities thereof are high, for the following reasons, and ample for attaining a prereduction rate of below 30% (reduction of the iron ore to FeO). That is, when CO and $H_2$ exist in the gas, the condition for obtaining FeO at 800° C. is $CO/CO_2 > 0.35$, which is satisfied by the trial calculation result of $CO/CO_2 = 0.36$.

When the secondary combustion rate is raised to 65% while the prereduction rate is maintained at a value smaller than 30% by adjusting the characteristics of the gas for prereduction in the above described manner, the consumption of coal is further decreased by several % as compared with that in the above described case of secondary combustion rate of 50%. In this connection, the coal consumption in the case where the secondary combustion rate exceeds 20% increases rapidly when the prereduction rate is 30% or more. On the other hand, since the coal consumption increases only slightly even when the prereduction rate falls below 33%, actual optimum value of the prereduction rate is in a range of from somewhat above 10% to below 30% in actual production.

By the method of this example, the secondary combustion rate can be further raised if a large quantity of gas is reformed by increasing the quantity of gas distributed into the gas pipe 41a. Therefore it is also possible to further decrease the coal consumption. In the case also where the secondary combustion rate is 60% or less, if the gas characteristics are adjusted by this method, the reductivity of the gas for prereduction can be increased. Therefore many advantages, such as the attainment of the same prereduction rate (below 30%) through the use of a prereduction furnace of small capacity, are afforded.

A further (fourth) example of apparatus suitable for use in the practice of this invention will now be described with reference to FIG. 6. Those parts in FIG. 6 which are the same or equivalent to corresponding parts in FIG. 5 are designated by like reference numerals. Detailed description of such parts will not be repeated. This example in FIG. 6 is adapted to the smelting process for iron production similarly as that shown in FIG. 5 but is characterized in that one portion of the cooled and dust-removed exhaust gas from the prereduction furnace 1, after being reformed, is admixed into the gas which has been generated in the smelting reduction furnace 2 and introduced through a gas pipe 51 into the prereduction furnace 1.

More specifically, the exhaust gas which has been discharged from the prereduction furnace 1 and flows through an exhaust gas pipe 58 is cooled and cleaned of dust in a wet-type dust collector 53 and is thereafter distributed into branch gas pipes 58a and 58b. The gas passed through the gas pipe 58b is discharged and disposed of as exhaust gas. The gas flowing through the gas pipe 58a is passed through a blower 54 and a decarburizing device 55 and joins and is admixed with the above described gas in the gas pipe 51. One portion of the resulting mixed gas, similarly as in the preceding example shown in FIG. 5, undergoes partial combustion in a partial combustion device 57 to raise the temperature of the gas and thereafter is introduced as gas for prereduction into the prereduction furnace 1.

In this example, furthermore, in order to adjust the characteristics of the gas for prereduction with even higher accuracy and positiveness, a gas pipe 51c is provided so that one portion of the generated gas from the smelting reduction furnace 2 can be discharged as exhaust gas through this gas pipe 51c when necessary. This gas conducted through the gas pipe 51c may be caused to join the flow of the above mentioned exhaust gas through the gas pipe 58b. Since the gas discharged in this manner contains a combustible component, it can be utilized as fuel within the iron and steel making factory.

In this example, also, the gas compositions and temperatures are so adjusted that the prereduction rate of the iron ore in the prereduction furnace 1 will be 33%. Therefore a high secondary combustion rate in the smelting reduction furnace 2 can be used, and molten iron can be obtained with a coal consumption which is less than in a known process. In this case, however, since the exhaust gas from the prereduction furnace 1 having less CO and $H_2$ than in the example illustrated in FIG. 5 is reformed, it is necessary to conduct through the gas pipe 58a and decarburize a greater quantity of gas (for example, 70 to 80% of the total exhaust gas quantity).

On the other hand, there is an advantage afforded by this example in that the quantity of the gas for prereduction can be adjusted by increasing or decreasing the quantity of gas distributed to the gas pipe 58a or the quantity of gas discharged out through the gas pipe 51c even in the event of fluctuation in the quantity of gas generation due to fluctuation in the state of operation of the smelting reduction furnace 2. This advantage is especially pronounced in the case where the prereduction furnace 1 is of the fluidized bed type, which requires accurate and positive adjustment of the flow rate of the gas for reduction.

It is to be noted that the above described method of adjusting the characteristics of the gas for prereduction is not limited in application to only the production of iron by reducing iron ore but is suitable also for application to smelting reduction of other metals by similar processes such as, for example, obtaining chromium by reduction of chromium ore ($Cr_2O_3$ or $FeCr_2O_4$).

By the above described method of adjusting the characteristics of the gas for prereduction, the following advantageous effects are afforded.

(1) Since the secondary combustion rate can be increased to a high value, the rate of consumption of coal required for obtaining molten metal is greatly decreased.

(2) It is necessary to reform only one portion of the generated gas from the smelting reduction furnace or the exhaust gas from the prereduction furnace, and therefore the costs of installation and operation of the reforming equipment are relatively low.

What is claimed is:

1. A method of smelting reduction of iron oxide ore, comprising the steps of:
   prereducing said ore in a solid state in a prereduction furnace;
   thereafter melting said ore and carrying out final reduction thereof in a smelting reduction furnace to generate a gas having a reductive capability in the smelting reduction furnace;
   subjecting said gas to a secondary combustion at a combustion rate of 25% or more in the smelting reduction furnace;
   introducing the gas thus subjected to the secondary combustion into said prereduction furnace; and controlling the rate of prereducing said ore in said prereduction furnace to be maintained at a value smaller than 30 percent.

2. A smelting reduction method according to claim 1, further comprising the steps of:
passing a portion of said gas subjected to the secondary combustion through as branch gas pipe line system to produce a reformed gas;
mixing the reformed gas with said gas subjected to the secondary combustion to produce a mixed gas;
raising the temperature of said mixed gas; and
adjusting the composition and the temperature of the mixed gas so as to maintain said rate of reducing the ore at said value.

3. A smelting reduction method according to claim 2 in which said reformed gas is produced by passing said portion of the gas is produced by passing said portion of the gas through a boiler for recovering sensible heat of the gas and through a partial combustion device.

4. A smelting reduction method according to claim 3 in which said reformed gas is produced by further passing said portion of the gas through a dust collector, a blower and a decarburizing device for removing $CO_2$.

5. A smelting reduction method according to claim 1, further comprising the steps of:
taking an exhaust gas from said prereduction furnace;
passing a portion of said exhaust gas through a branch gas pipe line system to produce a reformed gas in said gas pipe;
mixing the reformed gas with said gas subjected to the secondary combustion to produce a mixed gas;
raising the temperature of said mixed gas; and
adjusting the composition and the temperature of the mixed gas so as to maintain said rate of reducing the ore at said value.

6. A smelting reduction method according to claim 5 in which said reformed gas is produced by passing said portion of the exhaust gas through a dust collector, a blower and a decarburizing device for removing $CO_2$.

7. A smelting reduction method according to claim 1, in which said step of prereducing the ore is carried out at a reaction temperature of approximately 800° C. and the percentage ratio $CO/(CO+CO_2)$ in said gas introduced into the prereduction furnace is 65 percent or less.

8. A smelting reduction method according to claim 1, further comprising the step of passing said gas subjected to the secondary combustion through a dust remover, a steam generator and a partial combustion device before introducing the gas into the prereduction furnace.

* * * * *

US004940488B1

REEXAMINATION CERTIFICATE (3831st)

United States Patent [19]
Maeda et al.

[11] B1 4,940,488
[45] Certificate Issued Aug. 10, 1999

[54] METHOD OF SMELTING REDUCTION OF ORES CONTAINING METAL OXIDES

[75] Inventors: Takuya Maeda; Keikichi Murakami; Tsutomu Yamada, all of Kobe; Mitsuharu Kishimoto, Hyogo; Kenichi Yajima, Kobe, all of Japan

[73] Assignee: Kawasaki Jukogyo Kabushiki Kaisha, Kobe, Japan

Reexamination Request:
No. 90/005,144, Oct. 6, 1998

Reexamination Certificate for:
Patent No.: 4,940,488
Issued: Jul. 10, 1990
Appl. No.: 07/403,058
Filed: Sep. 1, 1989

Related U.S. Application Data

[63] Continuation-in-part of application No. 07/278,203, Nov. 30, 1988, abandoned.

[30] Foreign Application Priority Data

Dec. 7, 1987 [JP] Japan .................................. 62-310117
Dec. 8, 1987 [JP] Japan .................................. 62-310143

[51] Int. Cl.[6] ....................................................... C21B 11/00
[52] U.S. Cl. ............................................... 75/500; 75/446
[58] Field of Search ....................................... 75/500, 446

[56] References Cited

U.S. PATENT DOCUMENTS

4,244,732  1/1981  Brauns .
4,566,904  1/1986  von Bogdandy et al. .
4,940,488  7/1990  Maeda et al. .

OTHER PUBLICATIONS

"New Technologies for Efficient Utilization of Coal in the Iron and Steel Industry", Innes et al., May 11–16, 1986, pp. 87–92.
Coal Consumption is Smelting Reduction Compared with Blast Furnace, Brabie et al., pp. 205–210 of the Scandinavial Journal of Metallurgy, 4 (1775), pp. 205–210.
70th Steelmaking Conference Proceedings: vol. 70, Mar. 29–Apr. 1, 1987. Brotzmann, Karl pp. 3–12.

*Primary Examiner*—Melvyn Andrews

[57] ABSTRACT

Metal oxide ore is subjected to smelting reduction to obtain the molten metal by a method which comprises prereducing said ore in solid state in a prereduction furnace, thereafter melting said ore and carrying out final reduction thereof in a smelting reduction furnace, and at the same time introducing gas generated in said smelting reduction furnace and having reductive capability into said prereduction furnace, the rate of prereducing said ore in said prereduction furnace being controlled at a value with a maximum of the order of 33 percent for raising the rate of utilization of energy to a maximum limit.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 to 8 is confirmed.

* * * * *

(12) REEXAMINATION CERTIFICATE (4603rd)
United States Patent
Maeda et al.

(10) Number: US 4,940,488 C2
(45) Certificate Issued: Jun. 18, 2002

(54) METHOD OF SMELTING REDUCTION OF ORES CONTAINING METAL OXIDES

(75) Inventors: Takuya Maeda; Keikichi Murakami; Tsutomu Yamada, all of Kobe; Mitsuharu Kishimoto, Hyogo; Kenichi Yajima, Kobe, all of (JP)

(73) Assignee: Kawasaki Jukogyo Kabushiki Kaisha, Kobe (JP)

Reexamination Request:
No. 90/005,865, Nov. 24, 2000

Reexamination Certificate for:
Patent No.: 4,940,488
Issued: Aug. 10, 1999
Appl. No.: 07/403,058
Filed: Sep. 1, 1989

Reexamination Certificate B1 issued Aug. 10, 1999

Related U.S. Application Data

(63) Continuation-in-part of application No. 07/278,203, filed on Nov. 30, 1988, now abandoned.

(30) Foreign Application Priority Data

Dec. 7, 1987 (JP) ............................................. 63-310117
Dec. 8, 1987 (JP) ............................................. 62-310143

(51) Int. Cl.$^7$ .............................................. C21B 11/00
(52) U.S. Cl. .......................................... 75/500; 75/446
(58) Field of Search ................... 75/500, 446; 266/160

(56) References Cited

U.S. PATENT DOCUMENTS

| 4,244,732 A | 1/1981 | Brauns ........................... 75/38 |
| 4,566,904 A | 1/1986 | Von Bogdandy ............... 75/38 |
| 4,591,381 A | 5/1986 | Axelsson et al. .............. 75/40 |
| 4,936,908 A | 6/1990 | Takahashi et al. ............ 75/501 |
| 4,995,906 A | 2/1991 | Iwasaki et al. ............... 75/502 |

FOREIGN PATENT DOCUMENTS

DE        3133575        3/1983

OTHER PUBLICATIONS

Brotzmann, "New Concepts and Methods for Iron and Steel Production", The Howe Memorial Lecture, Mar. 30, 1987.
Ross, H.U.; "Direct Reduced Iron–Technology and Economics of Production and Use", Chapter 3, Physical Chemsitry; published by the Iron and Steel Society of the AIME no date.

*Primary Examiner*—Scott Kastler

(57) ABSTRACT

Metal oxide ore is subjected to smelting reduction to obtain the molten metal by a method which comprises prereducing said ore in solid state in a prereduction furnace, thereafter melting said ore and carrying out final reduction thereof in a smelting reduction furnace, and at the same time introducing gas generated in said smelting reduction furnace and having reductive capability into said prereduction furnace, the rate of prereducing said ore in said prereduction furnace being controlled at a value with a maximum of the order of 33 percent for raising the rate of utilization of energy to a maximum limit.

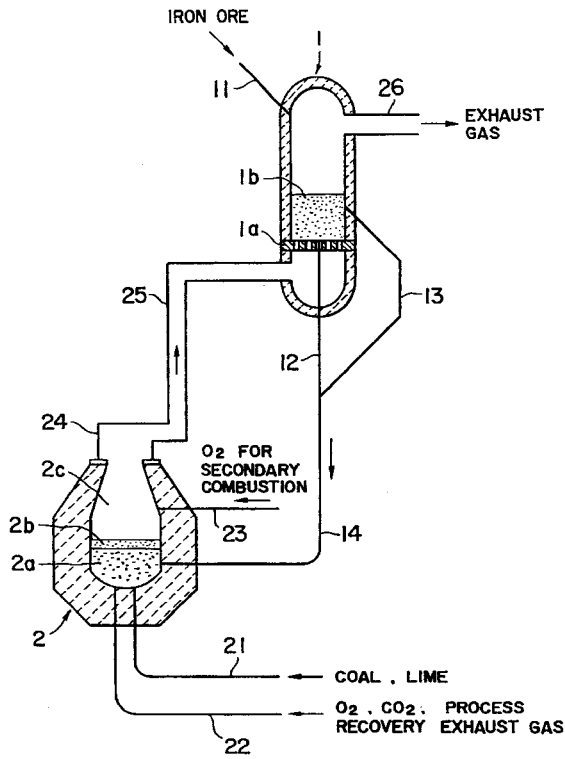

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–8 are cancelled.

New claims 9 and 10 are added and determined to be patentable.

*9. A method of smelting reduction of iron oxide ore, comprising the steps of:*

*prereducing said ore in a solid state in a pre-reduction furnace;*

*thereafter melting said ore and carrying out final reduction thereof in a smelting reduction furnace to generate a gas having a reductive capability in the smelting reduction furnace;*

*subjecting said gas to a secondary combustion at a combustion rate of 30% to 50% in the smelting reduction furnace;*

*introducing the gas thus subjected to the secondary combustion into said pre-reduction furnace;*

*controlling the rate of prereducing said ore in said pre-reduction furnace to be maintained at a value smaller than 30 percent; and*

*partially combusting the gas which has undergone the secondary combustion by supplying oxygen or a gas containing oxygen into the gas from the smelting reduction furnace after releasing the gas from the smelting reduction furnace.*

*10. A method of smelting reduction of iron oxide ore, comprising the steps of:*

*prereducing said ore in a solid state in a pre-reduction furnace;*

*thereafter melting said ore and carrying out final reduction thereof in a smelting reduction furnace to generate a gas having a reductive capability in the smelting reduction furnace;*

*subjecting said gas to a secondary combustion at a combustion rate of 30% to 60% in the smelting reduction furnace;*

*introducing the gas thus subjected to the secondary combustion into said pre-reduction furnace;*

*controlling the rate of prereducing said ore in said pre-reduction furnace to be maintained at a value smaller than 30 percent; and*

*partially combusting the gas which has undergone the secondary combustion by supplying oxygen or a gas containing oxygen into the gas from the smelting reduction furnace after releasing the gas from the smelting reduction furnace.*

\* \* \* \* \*